Aug. 19, 1969 E. O. P. TATTER ET AL 3,462,158

REPEAT AND MANUAL RECORD CHANGER

Filed July 15, 1966 3 Sheets-Sheet 1

Inventors
Ernest O. P. Tatter
Philip Vazzano
By Hofgren, Wegner, Allen, Stellman & McCord Attys Aug. 19, 1969 E. O. P. TATTER ET AL 3,462,158

REPEAT AND MANUAL RECORD CHANGER

Filed July 15, 1966 3 Sheets-Sheet 2

Aug. 19, 1969 E. O. P. TATTER ET AL 3,462,158

REPEAT AND MANUAL RECORD CHANGER

Filed July 15, 1966 3 Sheets-Sheet 3

United States Patent Office 3,462,158

Patented Aug. 19, 1969

3,462,158
REPEAT AND MANUAL RECORD CHANGER

Ernest O. P. Tatter, Addison, and Philip Vazzano, Des Plaines, Ill., assignors to Warwick Electronics Inc., a corporation of Delaware Filed July 15, 1966, Ser. No. 565,456
Int. Cl. G11b *17/10*
U.S. Cl. 274—10 17 Claims

ABSTRACT OF THE DISCLOSURE

A record changer having a turntable with a center spindle provided with a shelf for support of a record stack, and ejector member movable on the spindle to eject the lowermost record in the stack for movement of the turntable, and a selectively operable control mechanism to cause repeat playing of a record on the turntable including a first positionable member to move said ejector member to a position where the ejector member is ineffective to eject a record and a second positionable member to control the set down position of a tone arm for the size of the record that is to be repeat played.

This invention relates in general to record changers, and more particularly to a record changer having means whereby the playing of a record can be automatically repeated, if desired.

This invention is an improvement of the record changer disclosed and claimed in co-pending application Ser. No. 402,462 of Reed et al., filed Oct. 8, 1964, now Patent No. 3,394,938, and assigned to the assignee of the present invention. In the Reed et al. application, many novel features are disclosed, including a unique arrangement for sensing the size of a record ejected from a record stack, and conveying this information to a tone arm set down controlling means, which insures that the tone arm is set down in a proper position so that the stylus carried thereby will engage the beginning of the spiral groove of the ejected record. The record changer disclosed in the Reed et al. application includes an ejector lever pivotally mounted to a central spindle for ejecting the lowermost record in a record stack during a record change cycle. A size sensing finger is positionable under the record stack during the record change cycle, so as to be engaged by the ejected record and for sensing the size thereof. A cam is carried integrally with the record size sensing member, and is positioned in a predetermined location depending upon the size of the ejected record. A pivotally mounted set down lever has a portion engageable with the above mentioned cam to position the lever in the location corresponding to the size of the ejected record. A further portion of the set down lever is engageable with a cam carried by the tone arm to determine the proper set down position for the tone arm stylus. The present invention comprehends an improvement of the above described record changer apparatus which enables the repeat playing of a record which has been placed on the turntable either manually or automatically.

An object of the invention is to provide in an automatic record changer having ejector means for ejecting the lowermost record in a record stack during a record change cycle so that each of the records in the record stack will be lowered to a turntable, means for disabling the ejector means so that playing of the last ejected record on the turntable will be repeated.

Another object of the invention is to provide in an automatic record changer having a central spindle with a pivotally mounted ejector lever operable to eject the lowermost record in a record stack from a shelf on the spindle, means for maintaining the ejector lever in a non-operating position wherein the ejector lever will not eject the lowermost record in the record stack, so that playing of the previously ejected record can be repeated.

A more specific object of the invention is to provide, in a record changer as described in the preceding paragraph, means for lowering the ejector lever to an inactive position within the spindle wherein the upper portion of the ejector lever is disposed below the spindle shelf.

A further object of the invention is to provide an automatic record changer with means as described above for disabling the record ejector lever during a record change cycle without altering any of the other record change mechanism, so that repeat playing of a record can be atomatically accomplished.

Still another object of the invention is to provide, in an automatic record changer having a size sensing mechanism for determining the size of an ejected record and for controlling means for setting down the tone arm in a proper location, means for retaining the size sensing mechanism in a position corresponding to the size of a previously ejected record, so that the tone arm will be properly positioned during repeat playing of the ejected record.

These and other objects of the invention will hereinafter become more fully apparent from the following description taken in connection with the annexed drawings, wherein.

Figures 1, 2:
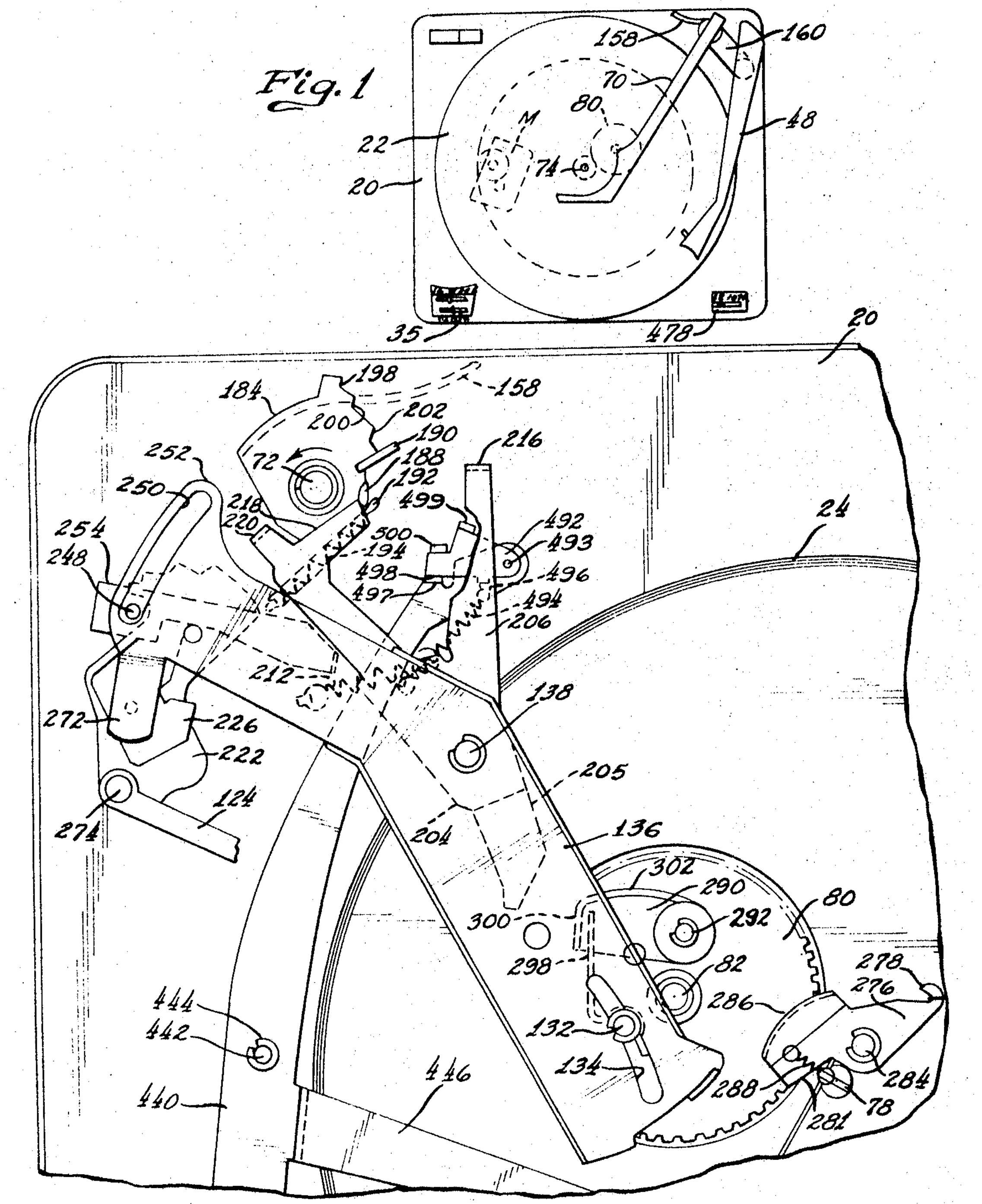
FIG. 1 is a plan view of a preferred record changer embodiment.
FIG. 2 is an enlarged fragmentary bottom view of the record changer illustrated in FIG. 1 showing the elements in position for repeat playing of a 7" record.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, wherein like reference characters designate like or corresponding parts throughout the several views, since the present invention is an improvement on the record changer disclosed in the above mentioned Reed et al. application, Serial No. 402,462, the same reference numerals have been utilized herein to indicate corresponding parts to facilitate cross referencing between the two applications. The following reference numerals identify structure shown in this application corresponding to structure similarly referenced in the above mentioned application but not used in the detailed description contained herein: 27, 38, 46, 66, 72, 82, 83, 134, 166, 180, 192, 205, 207, 210, 240, 248, 250, 252, 254, 278, 284, 288, 292, 294, 296, 298, 300, and 302. Only those elements of the record changer structure disclosed in the Reed et al. application which are necessary to an understanding of the present invention are described herein, and reference may be made to the Reed et al. application for a more complete description of the entire record changer structure.

Figure 5:
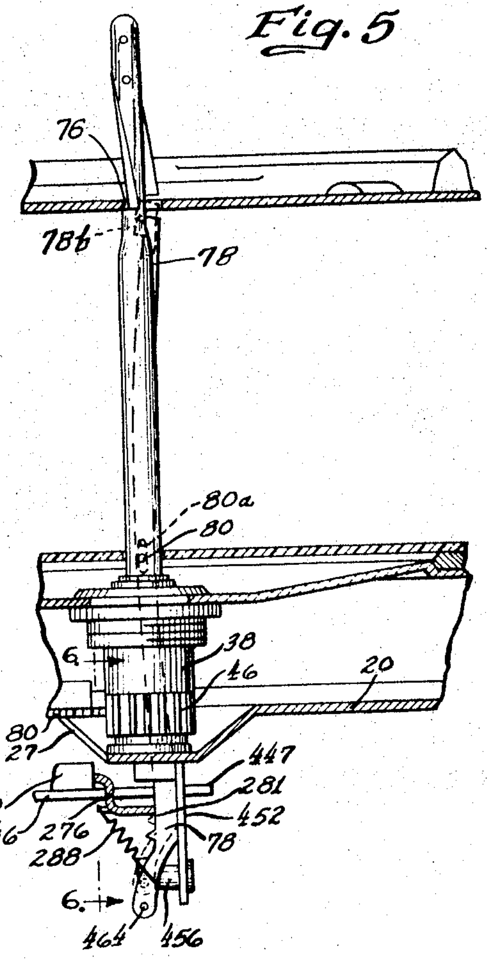
FIG. 5 is a sectional view, taken generally along line 5—5 of FIG. 3.

The illustrated record changer embodiment includes a generally rectangular motorboard 20 having a central well 24, in which a turntable 22 is rotatably mounted. The motor M (FIG. 1) drives a pulley mechanism for rotating the turntable 22, as is well known in the art. The record changer further includes a tone arm 48, which is provided with a conventional cartridge and stylus assembly for tracing the spiral groove of a record. Additionally, a pressure arm 70 is provided, and is adapted to overlie a stack of records to stabilize the same on a spindle 74 during automatic operation of the record changer. Spindle 74 is fixed on motorboard 20, and extends upwardly generally centrally of turntable 22. Spindle 74 is provided with a shelf 76 (FIG. 5) spaced above the turntable 22 for supporting a stack of records, and a movable ejector lever 78 is pivoted at 80 within spindle 74. Ejector lever 78 includes an enlarged upper end **78*b* which is adapted to project outwardly of the spindle during a record change cycle to engage within the central hole of the lowermost record in the record stack to eject the same from the spindle shelf 76. Ejector lever 78 is provided with a vertical slot 80*a* which is impaled by pivot pin 80, so that the ejector lever 78 is capable of limited vertical movement relative to the spindle 74.**

Tone arm 48 is mounted for pivotal movement relative to the motorboard 20 by suitable bearing structure carried within the upright portion 164 of housing 160 (FIG. 4), and tone arm 48 carries a cam 222 (FIG. 2) at the lower end thereof. A lever 124 is pivoted to cam 222 at 274, and is movable relative to the motorboard as the tone arm tracks across a record. When the tone arm tracks the relatively widely spaced lead out groove adjacent the center of the record, movement of the lever 124 is accelerated, and this motion is utilized to actuate a velocity trip mechanism for rotating a cycle gear 80. An eccentric drive pin 132 on cycle gear 80 pivots a rocker arm, 136 (FIG. 2) mounted on motorboard 20 by pivot pin 138, to move rocker arm drive pin 154 into engagement with an actuator 226. Actuator 226 releasably clutched to a cam 222 at the lower portion of the tone arm 48, and pivots the tone arm to an out-of-the-way position at the side of the turntable. Further pivotal movement of rocker arm 136 allows a spring 194 connected between cam 184 and the motorboard to position a size sensing finger 158 under the record stack, while a spring 212 connected between the motorboard and set down lever 204 pivots the set down lever and positions tab 216 on lever arm 206 against a stop 198 on the set down cam 184 to hold the cam 184 in the "in" or 7" record position. As the cycle gear 80 continues to rotate, the enlarged cam surface on lever 290 between cam surfaces 300 and 302 engages the cam surface 286 on the lever 276 to pivot lever 276 against the bias of spring 280 (FIG. 3) and move the surface 281 thereon into engagement with ejector lever 78. As the ejector lever is pivoted, the upper portion **78*b* of ejector lever 78 ejects the lowermost record in the record stack from the spindle shalf 76, and 10" or 12" records engage the size sensing member 158 to pivot the cam 184 to a position corresponding to the size of the ejected record while ejected 7" records do not engage member 158. Spring 194 holds abutment 216 on set down lever 204 in engagement with stop 198 (7"), stop 200 (10"), or stop 202 (12"), depending upon the size of the ejected record. This locates the stop 220 on set down lever 204 in proper position for engagement with the stop 242 (12"), 244 (10"), or 246 (7") on set down cam 222. Further pivotal movement of rocker arm 136 pivots the tone arm 48 inwardly over the turntable through the action of actuator 226 and set down cam 222, and the tone arm set down position is accurately determined by stop 220. Further rotation of rocker arm 136 allows abutment 218 on lever 204 to engage stop 188 in cam 184 and pivot the size sensing member 158 to an out-of-the-way position adjacent the side of the turntable, a cam surface 272 (FIG. 2) on rocker arm 136 lowers the stylus carried by the tone arm 48** into engagement with the outer portion of the record groove. The above described structure and sequence of operation is described in greater detail in Reed et al. application Ser. No. 402,462.

The improvement of the present invention includes a narrow, elongated lever 440 connected to the undersurface of the motorboard 20 by a vertical pivot pin 442. Lever 440 is a generally planar member so as to fit substantially flush against the bottom surface of the motorboard 20, and a spring 444 is preferably biased between an enlarged member at the lower portion of pivot 442 and the undersurface of lever 440 to hold the same against the undersurface of motorboard 20. An arm 446 extends generally laterally from lever 440 and is offset downwardly therefrom so as to clear the motorboard well 24. The base 450 of a generally L-shaped bracket 448 is secured to the well portion 24 (FIG. 3) of the motor 20 adjacent the spindle 74 by a pair of rivets 453, and the outwardly extending end 447 of arm 446 is slidably received in a slot 454 in a downwardly depending portion 452 of bracket 448. A horizontally disposed pivot pin 456 is secured to bracket portion 452 adjacent the lower end thereof, and a generally L-shaped actuating member 458 (FIG. 6) is pivotally mounted on pin 456.

Actuating member 458 is defined by a torsion spring having a generally circular central portion 460 embracing pin 456, a generally vertically extending portion 462 impaling an opening in arm 446 adjacent bracket 448, and a generally horizontally disposed portion 464 impaling on opening adjacent the lower end of ejector lever 78. From the foregoing, it will be readily apparent that as the lever 440 is pivoted in a clockwise direction about pivot 442 (as viewed from the bottom of the record changer), the end portion 447 of arm 446 will move to the left as viewed in FIG. 6 toward the end of slot 454. Thus, in turn, will pivot actuator member 458 about pin 456 to raise the ejector lever 78.

Figure 3:
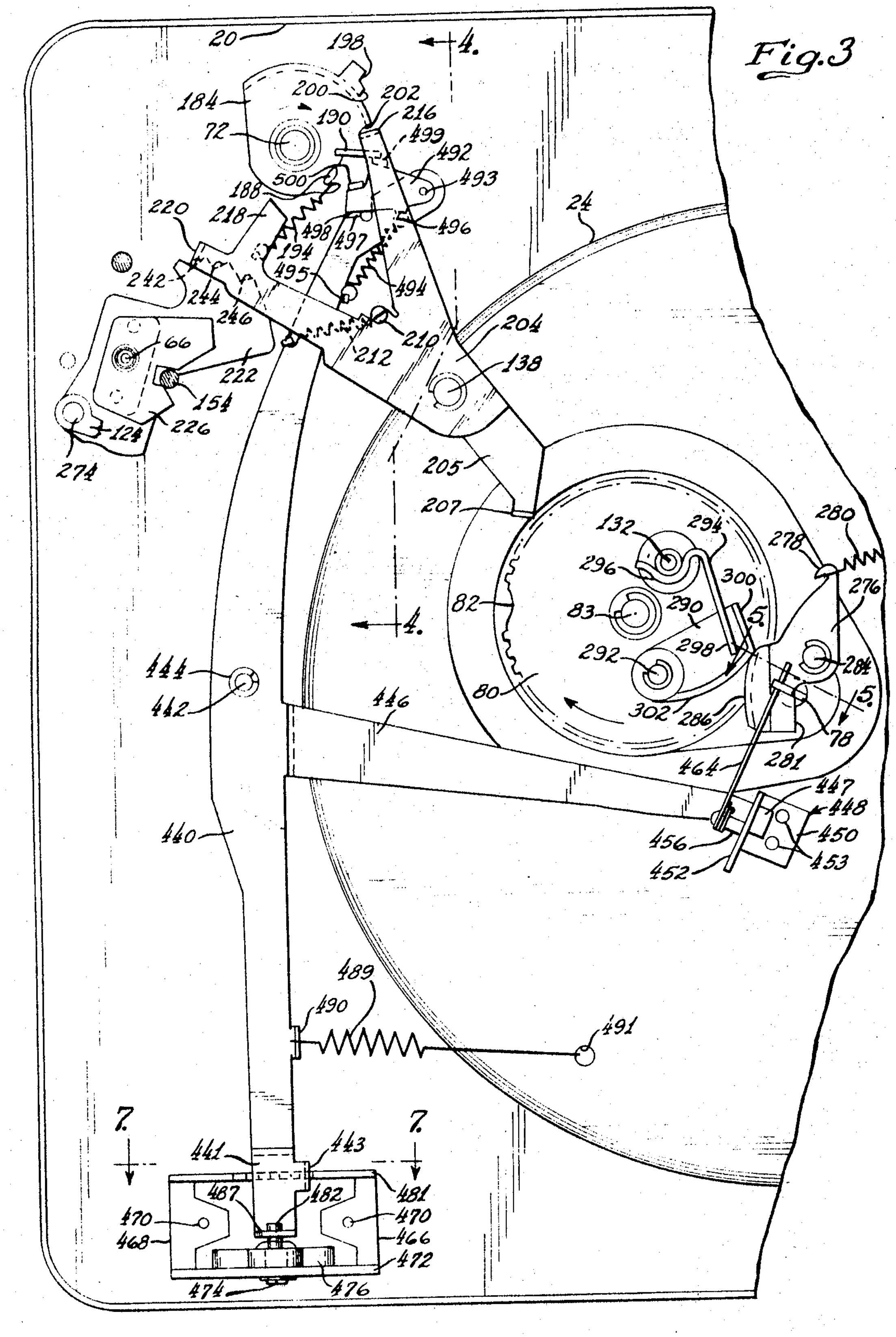
FIG. 3 is an enlarged fragmentary bottom view similar to FIG. 2 and showing the elements in position for repeat playing of a 12" record.
Figure 4:
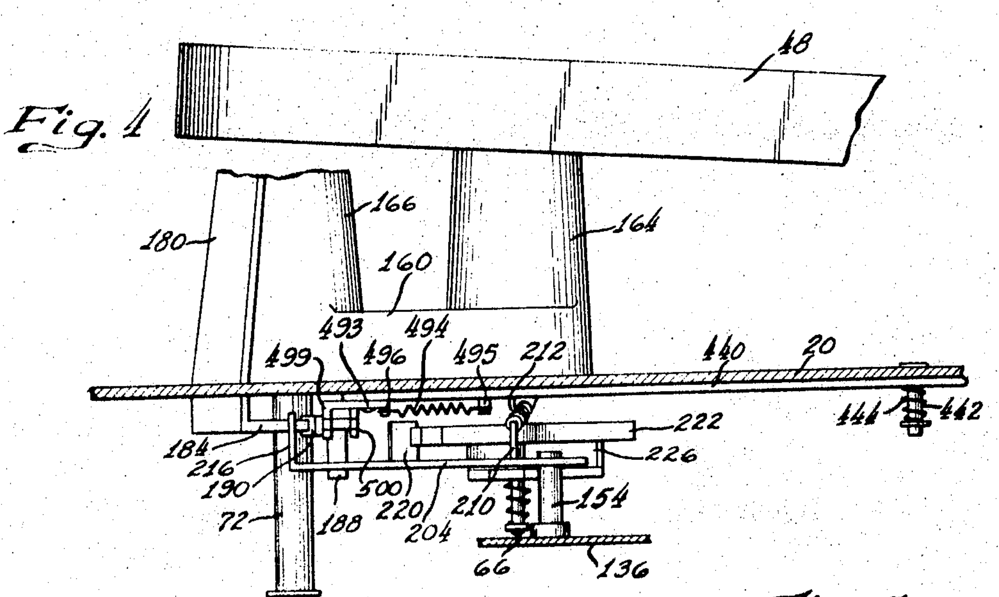
FIG. 4 is a sectional view taken generally along line 4—4 of FIG. 3.
Figure 7:
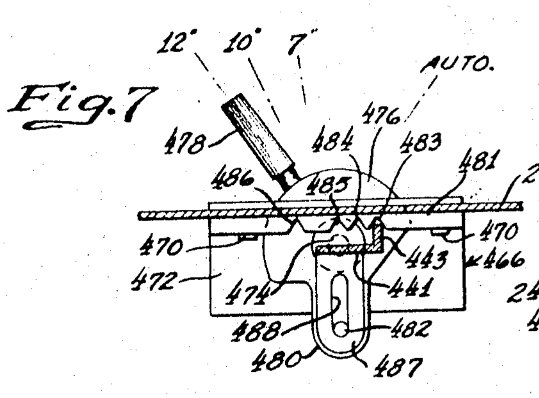
FIG. 7 is a sectional view, taken generally along line 7—7 of FIGS. 1 and 3.

The means for pivoting lever 440 will be best understood from a consideration of FIGS. 3 and 7. As shown therein, the base 468 of a bracket 466 is secured by rivets 470 to the undersurface of motorboard 20 adjacent one corner thereof. Bracket 466 includes a downwardly extending portion 472 having an opening therein in which a pin 474 is pivotally mounted. Pin 474 is secured to a selector member 476 having a rod-like handle 478 extending upwardly through an opening in the motorboard 20. Selector member 476 includes a downwardly extending portion 480 having a horizonally extending pin 482 thereon.

The end of lever 440 adjacent bracket 466 includes a downwardly offset horizontal portion 441 having an upwardly extending finger 443 at one side thereof. Bracket 466 includes a downwardly extending flange 481 positioned in vertical alignment with finger 443, and flange 481 includes a plurality of spaced detent notches 483–486 therein. The outer end 487 of lever portion 441 extends vertically downwardly, and is provided with a vertical slot 488 which slidably receives pin 482 therein. Notches 483–486 correspond respectively to 12", 10" and 7" repeat play and automatic play positions. Thus, if it is desired to repeat the playing of a 12" record, the handle portion 478 is positioned as is shown in FIGS. 3 and 7. If it is desired to repeat the playing of a 10" record, the selector member 476 is pivoted in a clockwise direction and finger 443 rides over the rise between notches 483 and 484 while the lever 440 is guided generally vertically downwardly by the engagement of pin 482 with slot 488. Spring 444 biases the lever 440 upwardly to retain the finger 443 in the selected detent notch. In a like manner, if it is desired to repeat the playing of a 7" record, the finger 443 is pivoted into the detent notch 485, while if normal automatic playing of records is desired, the finger 443 is pivoted into the detent notch 486.

Figure 6:
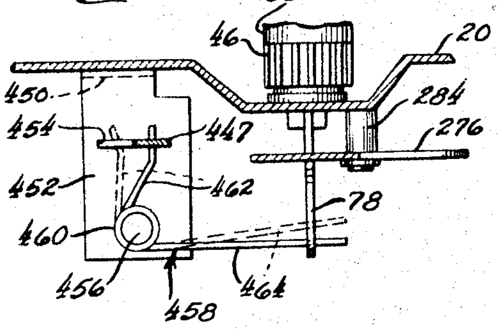
FIG. 6 is a sectional view, taken generally along line 6—6 of FIG. 5.

When an automatic record playing cycle has been selected by positioning finger 443 in detent notch 486, the arm portion 447 of arm 446 will be positioned adjacent the left hand side of slot 454, as viewed in FIG. 6. This will pivot the actuating member 458 an amount sufficent to lift the ejector member 78 to the broken line position shown in FIG. 5, where the upper end 78*b* of the ejector lever 78 is positioned so as to engage the center hole of the lowermost record in the record stack when the ejector lever 78 is pivoted by the cam 276. When finger 443 is positioned in notches 483–485, the upper portion 78*b* of the ejector lever 78 will be positioned below the spindle shelf 76, so that the lowermost record in the record stack will not be ejected even though the ejector lever 78 is pivoted during a record change cycle. Thus, when the finger 443 has been positioned in notches 483–485, the playing of the record on the turntable will be repeated. A spring 489 is connected between a downwardly extending tab 490 on the lever 440 and an opening 491 in the motorboard well 24 to bias the lever 440 toward the 12" position, it being understood that spring 444 is sufficiently strong to retain the finger in detent notches 484–486, when these positions have been selected.

Means are provided at the end of lever 440 remote from bracket 466 for insuring that the tone arm will set down in the proper position corresponding to the size of record which has been selected for repeat playing. This means will be best understood from a consideration of FIGS. 2–4. As is shown therein, an abutment carrying member 492 is pivotally mounted at 493 to the bottom of lever 440 adjacent the outer end thereof, and a spring 494 is connected between a tab 495 on lever 440 and a tab 496 on member 492 to urge member 492 in a counterclockwise direction about pivot 493. A stop surface 498 on member 492 is normally held against a depending abutment 497 on lever 440 by spring 494. A first downwardly extending abutment 499 is provided on member 492, and corresponds to the selection of a 12" record, and a second abutment 500 is provided on member 492 radially outwardly of abutment 499, and corresponds to a 10" record.

When it is desired to repeat the playing of a 12" record, the finger 443 on lever 440 is positioned in notch 483, and this disposes abutment 499 in the path of the radial arm 190 on cam 184, so that as the cam 184 is pivoted in a clockwise direction, as viewed in FIG. 3 by spring 194 during a record change sequence, the cam 184 will be properly positioned so that the upwardly extending portion 216 of set down lever 204 will engage the 12" cam stop 202. As is described above, this will position the stop 220 on set down lever 204 in position for engagement with surface 242 on cam 222 to insure that the tone arm 48 will set down in a proper position for a 12" record. If it is desired to repeat the playing of a 10" record, the finger 443 on lever 440 is positioned in notch 484, and the abutment 500 on member 492 is positioned for engagement by the radial arm 190 on the cam 184 as it pivots clockwise during a record change cycle. The engagement of arm 190 with abutment 500 positions stop 200 on cam 184 in a location to be engaged by the abutment 216 on the set down lever 204, so that the abutment 220 on the set down lever 204 will engage the surface 244 on cam 222 and insure the set down of the tone arm 48 in the proper position for playing a 10" record. It will be understood, of course, that when finger 443 is present in notches 483 or 484, the ejector lever 78 is lowered to a position where the upper end 78*b*, will not eject the lowermost record from the record stack, even though the ejector lever 78 is pivoted.

When it is desired to repeat the playing of a 7" record, the finger 443 on lever 440 is positioned in notch 485, and the lever will assume the position illustrated in FIG. 2. In this position, abutments 499 and 500 are spaced from arm 190 on cam 184 so that during the record change cycle, spring 194 will pivot the cam 184 in a clockwise direction until abutment 188 thereon engages the arm 218 on the set down lever 206. Once again, when repeat playing of a 7" record has been selected, the upper end 78*b* of the ejector lever 78 is positioned below the spindle shelf 76, so that even though the ejector lever 78 is pivoted, the lowermost record in the record stack is not ejected. Thus, the size sensing member 158 will remain in its innermost position, and the abutment 216 on the set down lever 204 will pivot into engagement with the 7" stop 202 to position the stop 220 on the set down lever 204 in position for engagement with the stop 246 on tone arm cam 222 to insure the proper set down position for the tone arm.

From the foregoing, it is believed apparent that each of the objects of the invention have been fully achieved. Repeat playing of 7", 10" or 12" records can be accomplished either manually or automatically by the structure of the present invention. During manual operation, the on-off lever 35 is moved to the "on" position to energize the motor M and rotate the turntable 22. The finger 443 on lever 440 is then positioned in the appropriate notch 484–486 by pivoting handle 478. This movement will pivot actuating member 458 in a clockwise direction, as viewed in FIG. 6, to lower the ejector lever 78 to a nonoperating position below the spindle shelf 76. After the playing of the record has been completed, and a record change cycle has been initiated by member 124, a normal change sequence will take place, but because the upper portion 78*b* of ejector lever 78 is disposed below the spindle shelf 76, the lowermost record in the record stack will not be ejected. Since there is no record ejection, the size sensing member 158 will not be engaged, and the cam 184 will be disposed in a 7" set down position, unless a 10" or 12" record has been selected for replaying, in which case the abutments 499 and 500 on the member 492 will determine the appropriate set down position for the tone arm. Since the member 492 is pivotally mounted on lever 440, the repeat playing cycle may be selected at any time either during playing of a record or during a record change cycle, in that the member 492 will always be properly positioned against stop 497 by spring 494, even if the member 492 is pivoted relative to lever 440 by engagement with arm 190 on came 184 during a record change cycle.

If it is desired to repeat the playing of the last record in a record stack, to prevent a last record shutoff cycle, it is necessary merely to lift the pressure arm 70 and pivot the same to the side of the turntable. This will prevent the actuation of the last record shutoff means described in detail in Reed et al. application Ser. No. 402,462 and will allow the repeat playing of the last record in the record stack. If the normal automatic record change cycle is desired, handle 478 is pivoted to position the finger 443 on lever 440 in detent notch 486, and abutments 499 and 500 are moved to a clearance position spaced from the radial arm 190 on cam 184, and the ejector lever 78 is lifted to a position where the upper end 78*b* is effective to eject the lowermost record in the record stack during a record change cycle.

We claim:

1. In an automatic record changer for sequentially playing each of the records in a record stack, and having ejector means including a movable element for ejecting the lowermost record in the record stack for movement to a turntable during a record change cycle, the improvement comprising: a member; actuator means coupled between said member and movable element for transferring movement of said member to said movable element; means mounting said member for movement between a first position wherein said movable element is positioned to perform a normal ejection operation and at least on second position wherein said movable element is maintained in a position wherein it is ineffectve to eject the lowermost record in the record stack, whereby playing of the record on the turntable will be repeated.

2. The invention set forth in claim 1 including a support and wherein said actuator is a generally L-shaped member pivotally mounted on said support at the junction of the legs thereof, one leg of said L-shaped member being connected to said member and the other leg of said L-shaped member being connected to said movable element.

3. The invention set forth in claim 2 wherein said support includes a generally horizontally disposed guide slot, and said member includes a horizontally disposed portion slidably received in said guide slot.

4. The invention set forth in claim 3 in which said L-shaped member is formed of spring material, and wherein the legs of said L-shaped member impale openings in said member portion and said movable element.

5. The invention set forth in claim 4 wherein said member includes a main body portion mounted on a vertical pivot, and said horizontally disposed portion is defined by an arm extending outwardly from said body portion.

6. In an automatic record changer for sequentially playing each of the records in a record stack, and having ejector means including a moveable element for ejecting the lowermost record in the record stack for movement to a turntable during a record change cycle, a tone arm and tone arm set down control means, the improvement comprising: a member; means mounting said member for movement between a first position and a plurality of different second positions; first means on said member for maintaining said movable element in a position wherein it is ineffective to eject the lowermost record when said member is in said plurality of different second positions and enabling a normal ejection function when in said first position; and second means on said member for cooperating with said set down control means when said member is in any one of said different second positions to establish one of a plurality of different predetermined set down points for said tone arm.

7. The apparatus of claim 6 wherein said different set down points correspond to 7″, 10″ and 12″ records and wherein three of said plurality of second positions correspond to 7″, 10″ and 12″ records.

8. The invention as set forth in claim 6 further comprising detent means for releasably retaining said member in said first and plurality of second positions.

9. The invention as set forth in claim 6 wherein said means mounting said member for movement includes a vertical pivot mounting said member for movement in a generally horizontal plane.

10. The invention as set forth in claim 6 wherein said tone arm set down control means comprises a movable record size sensing member positionable at location determined by the size of the record ejected by said ejector means and having stop means thereon, a movable tone arm set down controlling member for determining the set down position of said tone arm, and an information transmitting member for transmitting record size information from said size sensing member to said tone arm set down controlling member; and wherein said second comprises abutments each engageable selectively with the stop means of said record size sensing member when said member is in one of said plurality of second positions, whereby the proper set down position of said tone arm during repeat playing is insured.

11. The invention set forth in claim 10 wherein said member includes a stop, and wherein said abutments are carried by a pivotally mounted member yieldably urged against said stop by a spring.

12. The invention set forth in claim 10 wherein said stop means is defined by an arm extending generally radially outwardly of said size sensing member, and said member includes a first abutment corresponding to a 10″ record and a second abutment corresponding to a 12″ record.

13. In an automatic record changer for sequentially playing each of the records in a record stack, and having ejector means comprising a center spindle having a shelf for supporting a stack of records and a movable element is pivotally mounted within said spindle, one end of said movable element being located above said shelf for ejecting the lowermost record in the record stack for movement to a turntable during a record change cycle, a tone arm and tone arm set down control means, the improvement comprising: a member; means mounting said member for movement between a first position and a least one second position; first means on said member for maintaining said movable element in a position wherein said one end of said movable element is at a point below said shelf to prevent the ejection of the lowermost record when said member is in said at least one second position and enabling a normal ejection function when in said first position; and second means on said member for cooperating with said set down control means when said member is in said at least one second position to establish a predetermined set down point for said tone arm.

14. In an automatic record changer for sequentially playing each of the records in a record stack, and having ejector means including a movable element for ejecting the lowermost record in a record stack for movement to a turntable during a record change cycle, a tone arm and tone arm set down control means, the improvement comprising: a record repeat control member having a body portion mounted on a vertical pivot intermediate the ends thereof, an arm member extending laterally from a point between one end of said body portion and said vertical pivot, detent means associated with said one end for releasably retaining said record repeat control member in any one of a plurality of radially different positions, means located at the other end of said body portion for cooperating with said set down control means to preset the set down point of said tone arm when said record repeat control member is in at least one of said plurality of positions and means coupling the free end of said arm member to said movable element to disable said ejector means when said record repeat control member is in at least one of said plurality of positions.

15. The apparatus of claim 14 wherein the record repeat control member is settable to a first position and plurality of second positions, said means coupling said free end of said arm means to said movable member being effective to maintain said movable member in an operative record reject position when in said first position and to move said movable member to an inoperative record reject position when in any of said plurality of second positions.

16. The apparatus of claim 15 wherein said means at said other end of said body portion, when said record repeat control member is in said first position, is displaced from said set down control means and ineffective to preset said set down point and when said record repeat control member is in any of said plurality of second positions is effective to preset a different predetermined set down point for each of said second positions.

17. The apparatus of claim 14 wherein said means coupling said free end of said arm means to said movable element comprises an L-shaped member having a pair of legs, said L-shaped member being pivoted about a horizontal axis passing through the junction of said pair of legs, said legs being respectively coupled to said free end and to said movable member whereby rotation of said record repeat control member from one position to another will result in vertical movement of said movable member.

References Cited

UNITED STATES PATENTS

| | | | |
|---|---|---|---|
| 2,371,222 | 3/1945 | Compare | 274—10 |
| 2,511,604 | 6/1950 | Stolberg | 274—10 |

FOREIGN PATENTS

| | | |
|---|---|---|
| 668,098 | 3/1952 | Great Britain. |

HARRY N. HAROIAN, Primary Examiner